United States Patent
Peng et al.

(10) Patent No.: US 9,495,729 B2
(45) Date of Patent: Nov. 15, 2016

(54) DISPLAY METHOD AND ELECTRONIC DEVICE

(71) Applicants: Beijing Lenovo Software Ltd., Beijing (CN); LENOVO (BEIJING) LIMITED, Beijing (CN)

(72) Inventors: Gang Peng, Beijing (CN); Haibin Ke, Beijing (CN); Tao Jing, Beijing (CN)

(73) Assignees: Beijing Lenovo Software Ltd., Beijing (CN); LENOVO (BEIJING) LIMITED, Beijing (CN)

( * ) Notice: Subject to any disclaimer, the term of this patent is extended or adjusted under 35 U.S.C. 154(b) by 91 days.

(21) Appl. No.: 14/213,486

(22) Filed: Mar. 14, 2014

(65) Prior Publication Data

US 2014/0285527 A1   Sep. 25, 2014

(30) Foreign Application Priority Data

Mar. 19, 2013   (CN) .......................... 2013 1 0086890

(51) Int. Cl.
   *G06T 3/40*   (2006.01)
(52) U.S. Cl.
   CPC .................... *G06T 3/4092* (2013.01)
(58) Field of Classification Search
   None
   See application file for complete search history.

(56) References Cited

U.S. PATENT DOCUMENTS

| | | | | |
|---|---|---|---|---|
| 2007/0132720 A1* | 6/2007 | Kang | ........................ | G06F 3/14 345/156 |
| 2009/0199128 A1* | 8/2009 | Matthews | ............. | G06F 3/0481 715/799 |
| 2010/0026608 A1* | 2/2010 | Adams et al. | ................ | 345/2.1 |
| 2010/0060549 A1* | 3/2010 | Tsern | ............................. | 345/2.1 |
| 2010/0064228 A1* | 3/2010 | Tsern | ............................. | 715/740 |
| 2010/0269039 A1* | 10/2010 | Pahlavan et al. | ............. | 715/702 |
| 2010/0269046 A1* | 10/2010 | Pahlavan et al. | ............. | 715/740 |
| 2012/0075204 A1* | 3/2012 | Murray et al. | ................. | 345/173 |
| 2012/0260160 A1* | 10/2012 | Kim | ...................... | G06F 3/0481 715/234 |
| 2013/0283204 A1* | 10/2013 | Pasquero et al. | ............. | 715/784 |
| 2014/0055495 A1* | 2/2014 | Kim et al. | ..................... | 345/660 |
| 2014/0181646 A1* | 6/2014 | Rangwala | ......... | G06F 17/30719 715/252 |
| 2014/0267281 A1* | 9/2014 | Heyman et al. | .............. | 345/428 |
| 2015/0242067 A1* | 8/2015 | Ainslie | ................ | G06F 3/0482 715/815 |

\* cited by examiner

*Primary Examiner* — Xiao Wu
*Assistant Examiner* — Yu Chen
(74) *Attorney, Agent, or Firm* — Osha · Liang LLP (57) ABSTRACT

The present disclosure provides a display method and an electronic device. The method comprises: obtaining a third display content based on the first display content when the first electronic device is to be controlled by the second electronic device; and transmitting the third display content to the second electronic device to cause the second electronic device to display a fourth display content based on the third display content, the fourth display content being different from the first display content.

9 Claims, 3 Drawing Sheets

DISPLAY METHOD AND ELECTRONIC DEVICE

TECHNICAL FIELD

The present invention relates to electronic technology, and more particularly, to a display method and an electronic device.

BACKGROUND

Currently, with the development of the electronic technology, electronic devices have increasingly powerful functions. Moreover, a remote desktop control can be enabled while two electronic devices are interacting with each other.

The remote desktop control will be explained in the following.

When a remote desktop connection function is enabled in an electronic device, a user can control the electronic device using another electronic device across a network. Further, with the remote desktop function, the user can operate the electronic device in real time to install software on the electronic device or execute a program provided on the electronic device, as if the user is operating the electronic device directly. This is the essential function of the remote desktop control.

The above method is implemented by providing the remote desktop function within the electronic device. In the prior art, the electronic device can alternatively be controlled using a third-party remote control tool.

During the implementation of the present application, the inventors have discovered that, in the existing remote control schemes, desktop menu contents of the controlled electronic device or contents of applications in the controlled electronic device will be displayed on the desktop of the controlling electronic device used by the user. However, these display contents are transmitted to the controlling electronic device in a mirrored manner. When the model or type of the controlling electronic device is different from that of the controlled electronic device, it may cause incorrect operations.

For example, a mobile phone can serve as a controlling device and a notebook computer can serve as a controlled device. In this case, when the user is remotely controlling the notebook computer using the mobile phone, the notebook computer and the mobile phone may have different resolutions and different screen sizes. When desktop icons on the notebook computer is copied to the screen of the mobile phone in a mirrored manner, all the contents being displayed on the desktop of the notebook computer need to be displayed on the screen of the mobile phone. Hence, the icons displayed on the screen of the mobile phone may be very small. In this case, when the user tries to click an icon, he/she may click another icon by mistake and initiate the function associated with the wrong icon, resulting in an incorrect user operation. Further, since the icons are very small, it is very inconvenient for the user to operate.

Therefore, there is a problem in the prior art that, when the display contents in the controlled electronic device are transmitted to the controlling electronic device in a mirrored manner during the remote control process, the display contents cannot be adjusted adaptively so as to be suitable for the controlling electronic device.

SUMMARY

It is an object of the present invention to provide a display method and an electronic device that are capable of solving the problem in the prior art that, when the display contents in the controlled electronic device are transmitted to the controlling electronic device in a mirrored manner during the remote control process, the display contents cannot be adjusted adaptively so as to be suitable to be displayed by the controlling electronic device.

According to an embodiment of the present invention, a display method is provided. The display method is applied in a first electronic device. The first electronic device has a data connection with a second electronic device and is capable of receiving control from the second electronic device. The first electronic device has a first display unit. The first display unit has a first display content. The first display content has a first associated parameter. The second electronic device has a second display unit. The second display unit has a second display content. The second display content has a second associated parameter. The second display unit has a second resolution as its current display resolution. The method comprises: obtaining a third display content based on the first display content when the first electronic device is to be controlled by the second electronic device; and transmitting the third display content to the second electronic device to cause the second electronic device to display a fourth display content based on the third display content, the fourth display content being different from the first display content.

Preferably, the fourth display content contains a number K of first display objects, and when the fourth display content is displayed by the second display unit, each of the K first display objects is associated with a trigger area having a size larger than a preset trigger threshold in a second touch sensitive unit associated with the second display unit.

Preferably, the method further comprises, prior to obtaining the third display content based on the first display content: making a determination based at least on the first display content to obtain a determination result. The step of obtaining the third display content based on the first display content is performed based on the determination result.

Preferably, the first display content contains a number N of first display objects. Each of the N first display objects has the first associated parameter including first display pixel information of each of the N first display objects. The second display content contains a number M of second display objects. Each of the M second display objects has the second associated parameter including second display pixel information of each of the M second display objects. The step of making the determination based at least on the first display content to obtain the determination result comprises: determining whether the first display pixel information is smaller than the second display pixel information. The step of obtaining the third display content based on the first display content is performed when the first display pixel information is smaller than the second display pixel information.

Preferably, the first associated parameter includes first pixel interval information between every two of the N first display objects. The step of making the determination based at least on the first display content to obtain the determination result comprises: determining whether the first pixel interval information is the same as second pixel interval information received from the second electronic device. The step of obtaining the third display content based on the first display content is performed when the first pixel interval information is different from the second pixel interval information.

Preferably, the step of obtaining the third display content based on the first display content comprises: receiving adjustment information transmitted from the second electronic device; and obtaining the third display content based on the adjustment information and the first display content, the third display content being is different from the first display content and being the same as the fourth display content.

Preferably, the first display content is dividable into T pages of display contents. The T pages of display contents are associated with respective areas in the first display content that do not overlap each other. Each of the T pages of display contents contains a number Q of first display objects, where $0 \leq Q \leq K$. The fourth display content is one of the T pages of display contents that contains the first display objects.

Preferably, the fourth display content can be switched, in response to an operation in the second electronic device, to one of the T pages of display contents other than the fourth display content.

According to another embodiment of the present invention, an electronic device is provided. The electronic device has a data connection with a second electronic device and is capable of receiving control from the second electronic device. The electronic device has a first display unit. The first display unit has a first display content. The first display content has a first associated parameter. The second electronic device has a second display unit. The second display unit has a second display content. The second display content has a second associated parameter. The second display unit has a second resolution as its current display resolution. The electronic device comprises: a first obtaining unit configured to obtain a third display content based on the first display content when the electronic device is to be controlled by the second electronic device; and a transmitting unit configured to transmit the third display content to the second electronic device to cause the second electronic device to display a fourth display content based on the third display content, the fourth display content being different from the first display content.

Preferably, the fourth display content contains a number K of first display objects, and when the fourth display content is displayed by the second display unit, each of the K first display objects is associated with a trigger area having a size larger than a preset trigger threshold in a second touch sensitive unit associated with the second display unit.

Preferably, the electronic device further comprises: a determining unit configured to make a determination based at least on the first display content to obtain a determination result, prior to obtaining the third display content based on the first display content. The step of obtaining the third display content based on the first display content is performed based on the determination result.

Preferably, the first obtaining unit comprises: a receiving unit configured to receive adjustment information transmitted from the second electronic device; and a second obtaining unit configured to obtain the third display content based on the adjustment information and the first display content, the third display content being different from the first display content and being the same as the fourth display content.

One or more of the above solutions have the following effects or advantages.

In one or more of the above solutions, when the first electronic device is to be controlled by the second electronic device, the third display content is obtained based on the first display content and then transmitted to the second electronic device such that the second electronic device can display the fourth display content based on the third display content.

Here the fourth display content is different from the first display content. In particular, when the first electronic device is to be controlled by the second electronic device, it can adjust the first display content it displays into the third display content suitable to be displayed by the second electronic device. Alternatively, it can transmit the first display content it displays to the second electronic device for adjustment, such that the resulting display content can be suitable to be displayed by the second electronic device. With the display method of the present invention, when there are different types of electronic devices, it is possible to adjust the first display content adaptively such that it can be displayed flexibly on various electronic devices. It is possible to overcome the problem that, when the controlled electronic device and the controlling electronic device are different types of electronic devices, the display contents in the controlled electronic device can only be transmitted to the controlling electronic device in a mirrored manner and thus the display contents cannot be adjusted adaptively so as to be suitable to be displayed by the controlling electronic device. That is, the display method of the present invention has an effect of adaptively adjusting the display contents so as to be suitable to be displayed by the controlling electronic device.

Further, when the first display content is adjusted, the first associated parameter of the first display content is adjusted into a predetermined parameter threshold for the second electronic device, so as to be suitable to be displayed by the second electronic device. Here the parameter threshold can be a parameter threshold for the second associated parameter of the second electronic device, or a predetermined parameter threshold for the second electronic device.

Further, when the first display content is adjusted, the adjustment can be performed in two aspects. That is, a parameter associated with the first display objects contained in the first display content, e.g., the first display pixel information, can be adjusted based on the parameter associated with the second electronic device. Alternatively, the first display content can be divided into pages. During the division, the first display content can be adjusted based on the predetermined second pixel interval information of the second electronic device.

DETAILED DESCRIPTION OF THE EMBODIMENTS

In order to solve the problem in the prior art that, when display contents in a controlled electronic device are transmitted to a controlling electronic device in a mirrored manner during a remote control process, the display contents cannot be adjusted adaptively so as to be suitable for the controlling electronic device, according to the embodiments of the present invention, a display method and an electronic device are provided. The general concept of these solutions is as follows.

According to the present invention, a display method is provided. The display method is applied in a first electronic device. The first electronic device has a data connection with a second electronic device and is capable of receiving control from the second electronic device. The first electronic device has a first display unit. The first display unit has a first display content. The first display content has a first associated parameter. The second electronic device has a second display unit. The second display unit has a second display content. The second display content has a second associated parameter. The second display unit has a second resolution as its current display resolution. In particular, the method comprises: obtaining a third display content based on the first display content when the first electronic device is to be controlled by the second electronic device; and transmitting the third display content to the second electronic device to cause the second electronic device to display a fourth display content based on the third display content, the fourth display content being different from the first display content.

In the following, the solutions of the present invention will be described in detail with reference to the figures and the embodiments. It should be noted that the embodiments of the present invention and their specific features are given for illustrating the solutions of the present invention and are not intended to limit the scope of the present invention. The embodiments of the present invention and their specific features can be combined with each other, provided that they do not conflict.

First Embodiment

In this embodiment, a display method is provided.

The display method is applied in a first electronic device.

Further, the first electronic device has a data connection with a second electronic device and is capable of receiving control from the second electronic device.

Here, the first electronic device has a first display unit. The first display unit has a first display content. The first display content has a first associated parameter. The second electronic device has a second display unit. The second display unit has a second display content. The second display content has a second associated parameter. Moreover, the second display unit has a second resolution as its current display resolution.

In particular, in the embodiment of the present invention, the first electronic device can be any of various devices such as notebook computer, desktop computer, all-in-one computer, mobile phone, television set and the like. This is also the case for the second electronic device.

As an example, the first electronic device can be a notebook computer and the second electronic device can be a mobile phone.

The notebook computer has a display screen on which a first display content is displayed. The first display content contains a number N of first display objects. Each of the N first display objects has a first associated parameter including first display pixel information of each of the N first display objects.

In particular, the first display content here can be any of various contents. For example, when a WORD application is enabled in the notebook computer, the first display content may contain a background image and text information displayed by the WORD application. When a desktop is displayed on the notebook computer, the first display content may contain a background image and icons on the desktop.

Figure 1:
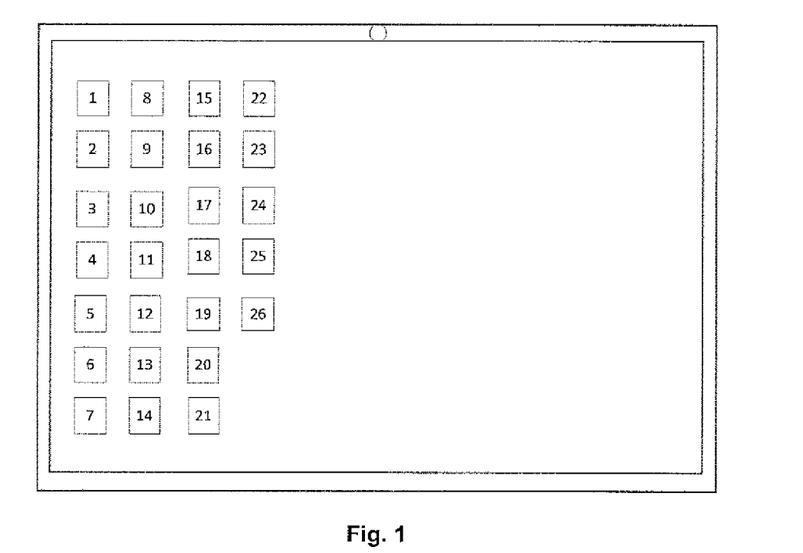
FIG. 1 is a schematic diagram showing icons displayed on a display screen of a notebook computer according to an embodiment of the present application.

In the example where the first display content contains a background image and icons, as shown in FIG. 1, the first display content is displayed on the display screen of the notebook computer. In this example, the first display content consists of a displayed background image and 26 icons. The arrangement of these 26 icons is shown in FIG. 1. In this case, each of these icons has a first associated parameter. For example, each icon has first display pixel information indicating pixels of each icon in the notebook computer. In an example, each icon may occupy 5*5 pixels in the notebook computer. The first associated parameter may further include first pixel interval information between every two of the N first display objects. For example, among these 26 icons, there is first pixel interval information between every two icons, indicating the interval between every two icons. For example, the interval between every two icons may be two pixels. Additionally, the notebook computer has its own resolution. In an example, the current display resolution of the notebook computer can be 1440*900.

Further, the mobile phone also has a display screen. The mobile phone also has its display content, which is named as "second display content" in order to distinguish it from the above described display content. The second display content can also be any of various contents. For example, after an e-book is opened, the second display content may include a background image of the displayed e-book and the text content in the e-book. When a menu desktop is enabled in the mobile phone, the second display content may include a background image and icons on the desktop. In this case the icons are second display objects. In particular, the second display content contains a number M of second display objects. Each of the M second display objects has the second associated parameter including second display pixel information of each of the M second display objects In the example where the second display content contains icons, the second display content consists of a background image displayed in the mobile phone and 31 icons displayed on the background image. Due to the limitation of the screen of the mobile phone, all the icons in the mobile phone may not be displayed on the screen of the mobile phone simultaneously. Instead, they can be displayed on pages. In particular, nine icons can be displayed on each page. When there are 31 icons in the mobile phone, they can be displayed on four pages: the first three pages each containing nine icons and the last page containing four icons. Alternatively, each of the four pages may contain less than nine icons and the number of icons displayed on these pages can be different from each other (31 icons in total are displayed). In particular, the 31 icons also have a second associated parameter. For example, each icon has second display pixel information indicating pixels of each icon in the mobile phone. In an example, each icon may occupy 7*7 pixels in the mobile phone. Additionally, the current display resolution of the mobile phone can be 240*320.

In the above examples, the values of M and N can be different from each other. However, they can be the same.

Further, the notebook computer can accept control from the mobile phone and adjust its own display scheme. The display method according to the embodiment of the present invention will be introduced in the following with reference to FIG. 2.

Figure 2:
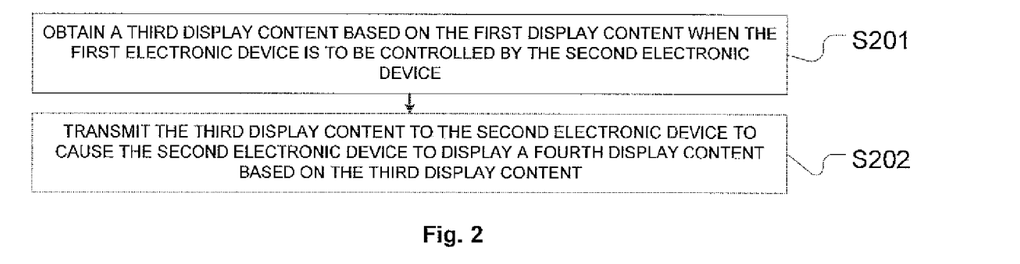
FIG. 2 is a flowchart of a display method according to an embodiment of the present invention.

At step S201, when the first electronic device is to be controlled by the second electronic device, a third display content is obtained based on the first display content.

At step S202, the third display content is transmitted to the second electronic device to cause the second electronic device to display a fourth display content based on the third display content.

Here, the fourth display content is different from the first display content.

Further, the fourth display content contains a number K of first display objects. When the fourth display content is displayed by the second display unit, each of the K first display objects is associated with a trigger area having a size larger than a preset trigger threshold in a second touch sensitive unit associated with the second display unit.

Figure 3A:
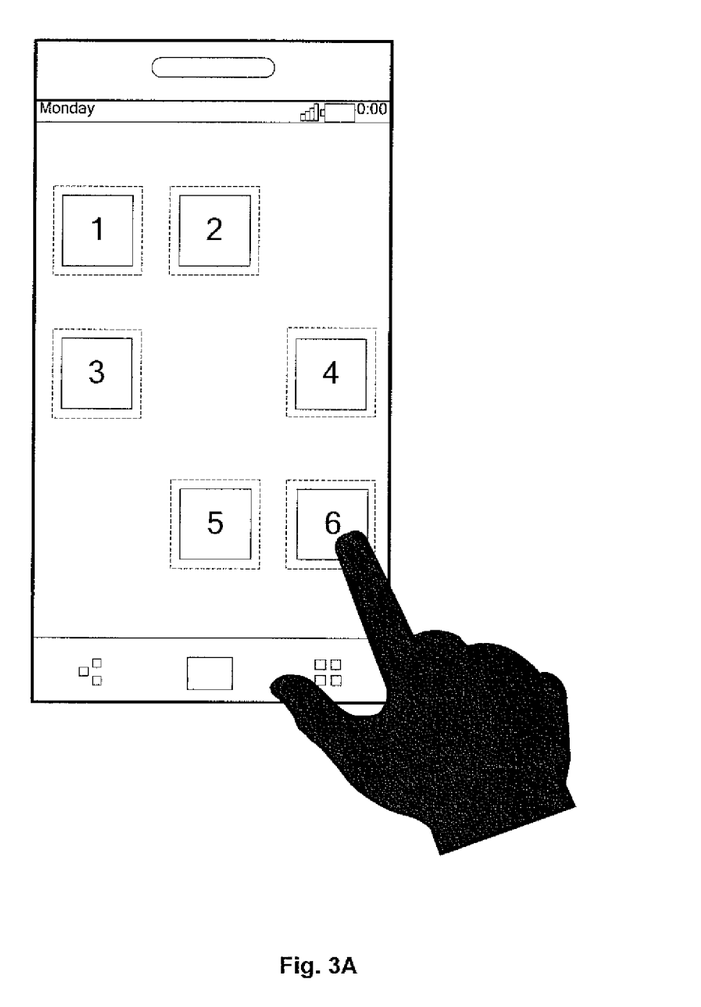
FIG. 3A is a schematic diagram showing trigger areas for icons in a mobile to phone according to an embodiment of the present invention.

In particular, in an example involving icons, the icons contained in the fourth display content can be icons in the notebook computer that have been adjusted. The number of the adjusted icons can be the same as the number of icons in the notebook computer, i.e., all the icons in the notebook computer are adjusted. Alternatively, the number of the adjusted icons can be different from the number of icons in the notebook computer, i.e., a certain number of the icons can be extracted from the notebook computer and then adjusted. Further, when the fourth display content is being displayed on the screen of the mobile phone, if the user wants to trigger a particular icon on a touch sensitive area, each of the K icons is associated with a trigger area having a size larger than a preset trigger threshold. For example, when an icon displayed on the mobile phone receives a trigger from the user, the pixels occupied by the icon itself constitute a trigger area for triggering the function of the icon. If this is the preset trigger threshold, when the K adjusted icons in the notebook computer are displayed on the mobile phone, in addition to the pixels occupied by each icon, a pixel area surrounding the icon can also be a trigger area for triggering the function of the icon. As shown in FIG. 3A, six icons are displayed on the screen of the mobile phone. Each icon is represented as a block. The pixels occupied by the block itself represent the preset trigger threshold. The pixels surrounding each of the six icons are also included in the trigger area, as shown in the dashed block in the figure. This area, which exceeds the original preset trigger threshold, is the area for triggering the function associated with the icon. When the user touches the touch area within the dashed block, he/she can trigger and control the icon to initiate its associated function.

Further, the above display method will be described with reference to the following example.

In this example, the first electronic device is a notebook computer and the second electronic device is a mobile phone. The notebook computer can accept control from the mobile phone. The specific contents contained in the notebook computer and in the mobile phone have been described above and the description thereof will be omitted here.

Initially, when the notebook computer is to be controlled by the mobile phone, a third display content can be obtained based on a first display content in the notebook computer. Here the third display content can be the same as the first display content or can be adjusted first display content. When the third display content is transmitted to the mobile phone, the mobile phone can display a fourth display content based on the third display content. In practice, the third and fourth display contents can be identical to, or different from, each other. However, the fourth display content is different from the first display content, which means that the content displayed on the mobile phone must be the adjusted first display content.

Then, the first, third and fourth display contents have the following relationship.

When the third and fourth display contents are identical to each other, it is the notebook computer that adjusts the first display content. In this case, the first and third display contents are different from each other. That is, the notebook computer adjusts the first display content into the third display content and then transmits it to the mobile phone, such that the mobile phone can display it directly.

When the third and fourth display contents are different from each other, it is the mobile phone that adjusts the first display content. In this case, the first and third display contents are identical to each other, i.e., they are in fact the same content. That is, the notebook computer transmits the third display content directly to the mobile phone, which then adjusts the third display content into the fourth display content for displaying.

In particular, the adjustment of the first display content by the notebook computer and the adjustment of the first display content by the mobile phone are different processes.

In the following, the process in which the first display content is adjusted by the notebook computer will be described first.

More specifically, the notebook computer adjusts the first display content based on parameters of the second display content in the mobile phone as obtained from the mobile phone.

Thus, prior to adjusting the first display content, a determination is made based at least on the first display content to obtain a determination result. The step of obtaining the third display content based on the first display content is performed based on the determination result.

The determination can be made based on the display pixel information as described above, or based on the pixel interval information as described above.

When the determination is made based on the display pixel information, the determination step includes: determining whether the first display pixel information is smaller than the second display pixel information. The step of obtaining the third display content based on the first display content is performed when the first display pixel information is smaller than the second display pixel information.

For example, when an icon in the notebook computer occupies 5*5 pixels and an icon in the mobile phone occupies 7*7 pixels, it is determined that the first display pixel information of the icon in the notebook computer is smaller than the second display pixel information of the icon in the mobile phone. In this case, the step of obtaining the third display content based on the first display content can be performed.

When the determination is made based on the pixel interval information, the determination step includes: determining whether the first pixel interval information is the same as second pixel interval information. The step of obtaining the third display content based on the first display content is performed when the first pixel interval information is different from the second pixel interval information.

Here, the second pixel interval information is received from the second electronic device.

In particular, the pixel interval information here is the pixel interval information between icons, as specified in the mobile phone, when the icons are obtained from another device. It does not represent the pixel interval information between the icons displayed on the mobile phone itself.

Thus, the obtained second pixel interval information is the pixel interval information preset in the mobile phone. In this case, it is determined whether the first pixel interval information for the icons in the notebook computer is the same as the second pixel interval information preset in the mobile phone. For example, when the first pixel interval information in the mobile phone indicates 8 pixels and the second pixel interval information indicates 19 pixels, it is determined that the first pixel interval information differs from the second pixel interval information. Then, the step of obtaining the third display content based on the first display content can be performed.

Once the determination has been made in either of the above two cases to obtain the determination result, the step of obtaining the third display content based on the first display content can be performed based on the determination result.

In particular, the step of obtaining the third display content based on the first display content includes: first receiving adjustment information transmitted from the second electronic device; and then obtaining the third display content based on the adjustment information and the first display content.

Here the third display content is different from the first display content and is the same as the fourth display content.

Here, the adjustment information varies in accordance with the above determination.

For example, when the adjustment is made based on the display pixel information, if it is determined that the first display pixel information is smaller than the second display pixel information, the adjustment may include: obtaining the third display content by adjusting the first display pixel information of each of the N first display objects into the second display pixel information based on the first display content.

Then, the third display content contains N first display objects, each of which has the second display pixel information, where N=K.

In this adjustment, all the icons each having 5*5 pixels in the notebook computer are adjusted into icons each having 7*7 pixels and then transmitted to the mobile phone for displaying.

When displaying these icons, the mobile phone will display them on pages following a rule that nine icons are displayed on each page. The details of the process for dividing the icons into pages will be omitted here.

Alternatively, the adjustment may include the following steps.

First, K first display objects can be extracted from the N first display objects based on the first display content.

Then, the third display content is obtained by adjusting the first display pixel information of each of the K first display objects into the second display pixel information.

Here, the K first display objects are the number of icons to be displayed on each page in the mobile phone. Each of these icons has the second display pixel information.

This adjustment is made based on the number of icons to be displayed on each page in the mobile phone. That is, a number (e.g., 7) of icons that can be displayed on one page in the mobile phone are extracted from the notebook computer first. Then, the first display pixel information of these 7 icons is adjusted into the second display pixel information. The resulting third display content is then transmitted to the mobile phone for displaying.

In particular, the subsequent adjustment can be made based on scrolling instructions received at the mobile phone, until all the icons in the notebook computer are adjusted to be displayed on the screen of the mobile phone.

In the above adjustment, each icon in the notebook computer is adjusted to have pixels of an icon in the mobile phone. Hence, when the icons are adjusted and displayed on the screen of the mobile phone, the user will view the same effect as that of the icons in the mobile phone itself.

Alternatively, in the adjustment based on display pixels, the pixels of each icon in the notebook computer can be adjusted based on a pixel threshold specified by the mobile phone. Here the threshold can be different from the pixels of an icon in the mobile phone. This adjustment is similar to the above adjustment and further details thereof will be omitted here.

As an alternative to the adjustment based on the display pixel information, the adjustment can be made based on the pixel interval information. In particular, this adjustment may include: obtaining the third display content by adjusting the first pixel interval information of each of the N first display objects into the second pixel interval information based on the second pixel interval information.

Then, the third display content contains N first display objects, each of which has the second pixel interval information, where N=K.

The resulting third display content are divided into pages and transmitted to the mobile phone.

For example, the first display content can be divided into T pages of display contents. The T pages of display contents are associated with respective areas in the first display content that do not overlap each other.

Each of the T pages of display contents contains a number Q of first display objects, where 0≤Q≤K. The fourth display content is one of the T pages of display contents that contains the first display objects.

In particular, the entire page of display content in the notebook computer (including the displayed background image and icons) is divided into T pages. The is T pages of display contents are associated with different areas on the screen of the notebook computer. Each of the T pages of display contents contains a number of first display objects. Here, each page may contain the same number of first display objects, e.g., each page may contain nine first display objects. Alternatively, different pages may contain different numbers of first display objects, e.g., the first page may contain five first display objects and the second page may contain seven first display objects.

After the division, the T pages of display contents can be transmitted to the mobile phone for displaying. The fourth display content is initially displayed on the mobile phone and then the fourth display content can be switched, in response to an operation on the mobile phone, to one of the T pages of display contents other than the fourth display content.

The above situation will be explained in the following with reference to an example.

Figure 3B:
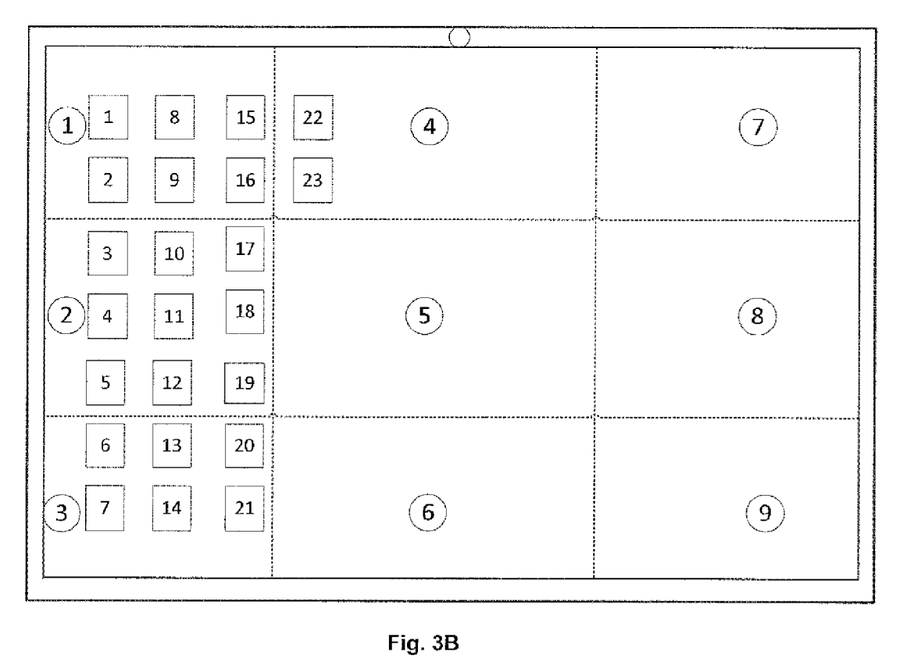
FIG. 3B is a schematic diagram showing a scenario in which a display content of a notebook computer is divided into nine pages of display contents according to an embodiment of the present invention.

For example, referring to FIG. 3B, there are 23 icons displayed on the desktop of the notebook computer. In this case, the first display content consists of a background image of the desktop (which is white in this case) and the 23 icons.

Then, the first display content can be divided into nine pages. In the embodiment of the present application, the number of pages can be calculated based on a first resolution, which is the current display resolution of the notebook computer, and a second resolution, which is the current display resolution of the mobile phone. In practice, there may be other calculation schemes. The present application is not limited to any specific calculation scheme.

It is assumed that the first display content is divided into nine pages in the order represented by the circled numbers in FIG. 3B. Each of the resulting nine pages of display contents is associated with a display area defined by the dashed lines in the figure. It can be seen that, in the first display content, the respective areas associated with the nine pages of display contents do not overlap each other. Further, among the nine pages of display contents, only the display content on each of Page ①, Page ②, Page ③ and Page ④ contains icons, while the display content on any other page contains the background image only.

In particular, six icons are displayed on Page ①; nine icons are displayed on Page ②; six icons are displayed on Page ③; and two icons are displayed on Page ④.

Here, the pixel interval information between icons on each page can be adjusted as described above. The details of the adjustment will be omitted here.

In particular, the fourth display content is the display content on Page ①.

When the nine pages of display contents are transmitted to the mobile phone for displaying, the display content on Page ① is initially displayed on the mobile phone. When the user wants to scroll to another page, the mobile phone can execute a scrolling instruction from the user and thus display any of the other eight pages of display contents. In the embodiment of the present invention, the display content has been divided into pages in a particular order by the notebook computer. Hence, the mobile phone will display the pages in the same order in response to the scrolling instruction from the user. For example, after displaying the display content on Page ①, in response to the scrolling instruction from the user, the mobile phone will display the display content on Page ②, and so on.

While displaying the display content containing icons on a particular page, e.g., the display content on Page ②, the mobile phone can receive an operation from the user for operating the icons on Page ②. In this case, each icon is associated with a trigger area having a size larger than a preset trigger threshold. Here the size of the trigger area associated with an icon is similar to that shown in FIG. 3A. When the user touches the touch area within the dashed block, he/she can trigger and control the icon to initiate its associated function.

In the embodiment of the present invention, the process in which the first display content in the notebook computer is divided into pages and then Is transmitted to the mobile phone for displaying and operating has been described.

In this process, these pages of display contents are associated with different display areas in the notebook computer. Each page of display content can receive a user operation independently, without affecting complete display of the display content on another page. For example, when the display content on Page ① is being displayed and a scrolling operation is received from the user, the display content on Page ② can be displayed completely, rather than partly, on the screen of the mobile phone.

Alternatively, the adjustment may include the following steps.

First, second resolution information transmitted from the second electronic device is received.

Then, K first display objects are extracted from the N first display objects based on the second resolution information and the second pixel interval information.

Then, the third display content is obtained by adjusting the first pixel interval information of each of the K first display objects into the second pixel interval information.

Here, the K first display objects are the number of icons to be displayed on each page in the mobile phone. Each of these icons has the second pixel interval information.

This adjustment is made based on the resolution of the mobile phone. The number (e.g., 7) of icons that can be displayed on each page in the mobile phone can be calculated based on the resolution of the mobile phone and the second pixel interval information. Then, the first pixel interval information of these 7 icons is adjusted into the second pixel interval information. The resulting third display content is then transmitted to the mobile phone for displaying.

In particular, the subsequent adjustment can be made based on scrolling instructions received at the mobile phone, until all the icons in the notebook is computer are adjusted to be displayed on the screen of the mobile phone.

The process in which the first display content is adjusted by the notebook computer has been described above. In the following, the process in which the first display content is adjusted by the mobile phone will be explained in detail.

In particular, when the first display content is adjusted by the mobile phone, the first and third display contents are in fact the same. Thus, when the third display content is transmitted from the notebook computer to the mobile phone, the mobile phone will use its own second associated parameter to adjust the third display content.

In particular, the adjustment is also made based on the display pixel information and the pixel interval information of the third display content. The adjustment schemes have been described above in detail. The adjustment schemes here are substantially the same the adjustment schemes as described above, except that the adjustment is made by the mobile phone instead of the notebook computer. Thus, the details of these adjustment schemes will be omitted here.

The display method has been described in the above embodiment. In the following embodiment, an electronic device based on the same inventive concept will be explained.

Second Embodiment

According to the embodiment of the present invention, an electronic device is provided.

In particular, the electronic device has a data connection with a second electronic device and is capable of receiving control from the second electronic device. The electronic device has a first display unit. The first display unit has a first display content. The first display content has a first associated parameter. The second electronic device has a second display unit. The second display unit has a second display content. The second display content has a second associated parameter. Further, the second display unit has a second resolution as its current display resolution.

The associated parameters of the electronic device and the second electronic device in this embodiment have been described above in connection with the above embodiment and thus the description thereof will be omitted here.

Figure 4:
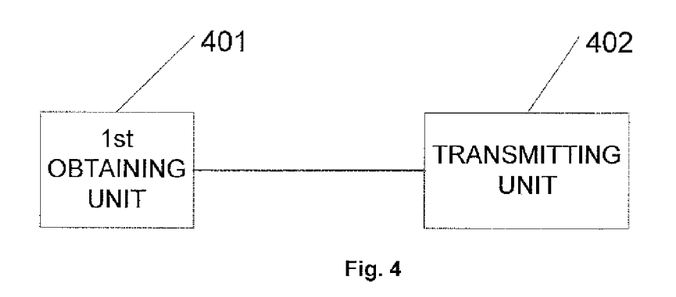
FIG. 4 is a schematic diagram of an electronic device according to an embodiment of the present invention.

Referring to FIG. 4, the electronic device includes the following units.

A first obtaining unit 401 is configured to obtain a third display content based on the first display content when the electronic device is to be controlled by the second electronic device.

A transmitting unit 402 is configured to transmit the third display content to the second electronic device to cause the second electronic device to display a fourth display content based on the third display content. The fourth display content is different from the first display content.

Further, the fourth display content contains a number K of first display objects. When the fourth display content is displayed by the second display unit, each of the K first display objects is associated with a trigger area having a size larger than a preset trigger threshold in a second touch sensitive unit associated with the second display unit.

The electronic device further includes: a determining unit configured to make a determination based at least on the first display content to obtain a determination result, prior to obtaining the third display content based on the first display content. The step of obtaining the third display content based on the first display content is performed based on the determination result.

Further, the first obtaining unit 401 includes: a receiving unit configured to receive adjustment information transmitted from the second electronic device; and a second obtaining unit configured to obtain the third display content based on the adjustment information and the first display content. The third display content is different from the first display content and is the same as the fourth display content.

One or more of the embodiments of the present invention have the following technical effects.

In one or more of the embodiments of the present invention, when the first electronic device is to be controlled by the second electronic device, the third display content is obtained based on the first display content and then transmitted to the second electronic device such that the second electronic device can display the fourth display content based on the third display content. Here the fourth display content is different from the first display content In particular, when the first electronic device is to be controlled by the second electronic device, it can adjust the first display content it displays into the third display content suitable to be displayed by the second electronic device. Alternatively, it can transmit the first display content it displays to the second electronic device for adjustment, such that the resulting display content can be suitable to be displayed by the second electronic device. With the display method of the present invention, when there are different types of electronic devices, it is possible to adjust the first display content adaptively such that it can be displayed flexibly on various electronic devices. It is possible to overcome the problem that, when the controlled electronic device and the controlling electronic device are different types of electronic devices, the display contents in the controlled electronic device can only be transmitted to the controlling electronic device in a mirrored manner and thus the display contents cannot be adjusted adaptively so as to be suitable to be displayed by the controlling electronic device. That is, the display method of the present invention has an effect of adaptively adjusting the display contents so as to be suitable to be displayed by the controlling electronic device.

Further, when the first display content is adjusted, the first associated parameter of the first display content is adjusted into a predetermined parameter threshold for the second electronic device, so as to be suitable to be displayed by the second electronic device. Here the parameter threshold can be a parameter threshold for the second associated parameter of the second electronic device, or a predetermined parameter threshold for the second electronic device.

Further, when the first display content is adjusted, the adjustment can be performed in two aspects. That is, a parameter associated with the first display objects contained in the first display content, e.g., the first display pixel information, can be adjusted based on the parameter associated with the second electronic device. Alternatively, the first display content can be divided into pages. During the division, the first display content can be adjusted based on the predetermined second pixel interval information of the second electronic device.

It can be appreciated by those skilled in the art that the embodiments of the present invention can be implemented as a method, a system or a computer program product. The present invention may include pure hardware embodiments, pure software embodiments and any combination thereof. Also, the present invention may include a computer program product implemented on one or more computer readable storage medium (including, but not limited to, magnetic disk storage, CD-ROM, optical storage) containing computer readable program codes.

The present invention have been described with reference to the flowcharts and/or block diagrams of the method, device (system) and computer program product according to the embodiments of the present invention. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by the computer or the processor of any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute an article of manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

Obviously, various modifications and variants can be made to the present invention by those skilled in the art without departing from the spirit and scope of the present invention. Therefore, these modifications and variants are to be encompassed by the present invention if they fall within the scope of the present invention as defined by the claims and their equivalents.

What is claimed is:

1. A display method applied in a first electronic device, the first electronic device having a data connection with a second electronic device and being capable of receiving control from the second electronic device, the first electronic device having a first display unit, the first display unit having a first display content, the first display content having a first associated parameter, the first display unit having a first resolution, the second electronic device having a second display unit, the second display unit having a second display content, the second display content having a second associated parameter, the second display unit having a second resolution as its current display resolution, the method comprising:

obtaining a third display content based on the first display content when the first electronic device is controlled by the second electronic device; and transmitting the third display content to the second electronic device to cause the second electronic device to display a fourth display content based on the third display content, the fourth display content being different from the first display content,
wherein the fourth display content contains a number K of first display objects, and when the fourth display content is displayed by the second display unit, each of the K first display objects is associated with a trigger area having a size larger than a preset trigger threshold in a second touch sensitive unit associated with the second display unit,
wherein the preset trigger threshold is an area occupied by each of the K first display objects on the second display unit, and
wherein the first display content is dividable into T discrete pages of display contents based on the first resolution and the second resolution, the T pages of display contents are associated with respective areas in the first display content that do not overlap each other, each of the T pages of display contents contains a number Q of first display objects, where $0 \le Q \le K$, and the fourth display content is one of the T pages of display contents that contains the first display objects.

2. The method of claim 1, further comprising, prior to obtaining the third display content based on the first display content:
making a determination based at least on the first display content to obtain a determination result,
wherein the step of obtaining the third display content based on the first display content is performed based on the determination result.

3. The method of claim 2, wherein
the first display content contains a number N of first display objects, and each of the N first display objects has the first associated parameter including first display pixel information of each of the N first display objects,
the second display content contains a number M of second display objects, and each of the M second display objects has the second associated parameter including second display pixel information of each of the M second display objects, and
the step of making the determination based at least on the first display content to obtain the determination result comprises:
determining whether the first display pixel information is smaller than the second display pixel information,
wherein the step of obtaining the third display content based on the first display content is performed when the first display pixel information is smaller than the second display pixel information.

4. The method of claim 2, wherein
the first associated parameter includes first pixel interval information between every two of the N first display objects, and
the step of making the determination based at least on the first display content to obtain the determination result comprises:
determining whether the first pixel interval information is the same as second pixel interval information received from the second electronic device,
wherein the step of obtaining the third display content based on the first display content is performed when the first pixel interval information is different from the second pixel interval information.

5. The method of claim 1, wherein the step of obtaining the third display content based on the first display content comprises:
receiving adjustment information transmitted from the second electronic device; and
obtaining the third display content based on the adjustment information and the first display content, the third display content being different from the first display content and being the same as the fourth display content.

6. The method of claim 1, wherein the fourth display content can be switched, in response to an operation in the second electronic device, to one of the T pages of display contents other than the fourth display content.

7. An electronic device having a data connection with a second electronic device and being capable of receiving control from the second electronic device, the electronic device having a first display unit, the first display unit having a first display content, the first display content having a first associated parameter, the first display unit having a first resolution, the second electronic device having a second display unit, the second display unit having a second display content, the second display content having a second associated parameter, the second display unit having a second resolution as its current display resolution, the electronic device comprising:
a first obtaining unit configured to obtain a third display content based on the first display content when the electronic device is to be controlled by the second electronic device; and
a transmitting unit configured to transmit the third display content to the second electronic device to cause the second electronic device to display a fourth display content based on the third display content, the fourth display content being different from the first display content,
wherein the fourth display content contains a number K of first display objects, and when the fourth display content is displayed by the second display unit, each of the K first display objects is associated with a trigger area having a size larger than a preset trigger threshold in a second touch sensitive unit associated with the second display unit,
wherein the preset trigger threshold is an area occupied by each of the K first display objects on the second display unit, and
wherein the first display content is dividable into T discrete pages of display contents based on the first resolution and the second resolution, the T pages of display contents are associated with respective areas in the first display content that do not overlap each other, each of the T pages of display contents contains a number Q of first display objects, where $0 \le Q \le K$, and the fourth display content is one of the T pages of display contents that contains the first display objects.

8. The electronic device of claim 7, further comprising:
a determining unit configured to make a determination based at least on the first display content to obtain a determination result, prior to obtaining the third display content based on the first display content,
wherein the step of obtaining the third display content based on the first display content is performed based on the determination result.

9. The electronic device of claim 7, wherein the first obtaining unit comprises:
a receiving unit configured to receive adjustment information transmitted from the second electronic device; and
a second obtaining unit configured to obtain the third display content based on the adjustment information and the first display content, the third display content being different from the first display content and being the same as the fourth display content.

* * * * *